United States Patent [19]

Clapp et al.

[11] Patent Number: 5,567,456
[45] Date of Patent: *Oct. 22, 1996

[54] FOOD RELEASE COMPOSITIONS WITH ORGANIC FLUIDIZING AGENTS

[75] Inventors: Clarence P. Clapp; George S. Torrey, both of Danville, Ill.

[73] Assignee: Creative Products Inc. of Rossville, Rossville, Ill.

[ * ] Notice: The term of this patent shall not extend beyond the expiration date of Pat. No. 5,374,434.

[21] Appl. No.: 270,632

[22] Filed: Jul. 1, 1994

Related U.S. Application Data

[63] Continuation-in-part of Ser. No. 787,193, Nov. 4, 1991, Pat. No. 5,374,434.

[51] Int. Cl.$^6$ .................................. A23D 9/00; A23J 7/00
[52] U.S. Cl. ..................... 426/116; 426/609; 426/662; 426/811
[58] Field of Search ........................ 426/115, 116, 426/609, 811, 662

[56] References Cited

U.S. PATENT DOCUMENTS

| | | |
|---|---|---|
| 3,661,605 | 5/1972 | Rubin et al. . |
| 3,896,975 | 7/1975 | Follmer . |
| 4,073,411 | 2/1978 | Doumani . |
| 4,073,412 | 2/1978 | Doumani . |
| 4,104,403 | 8/1978 | Barker et al. . |
| 4,142,003 | 2/1979 | Sejpel . |
| 4,155,770 | 5/1979 | Doumani . |
| 4,163,676 | 8/1979 | Konigsbacher . |
| 4,188,412 | 2/1980 | Sejpal . |
| 4,192,898 | 3/1980 | Hanson . |
| 4,339,465 | 7/1982 | Strouss et al. . |
| 4,371,451 | 2/1983 | Scotti et al. . |
| 4,459,285 | 7/1984 | Grollier et al. . |
| 4,654,220 | 3/1987 | Heine et al. . |

OTHER PUBLICATIONS

Lecithins, Ed. by Szuhaj et al. 1985, Chap 10, pp. 203–211 (Schmidt et al).
Lecithins, American Oil Chemists Society, Schmidt et al, Chapter Ten—Modified Lecithins, pp. 203–211, 1985.

*Primary Examiner*—Steven Weinstein
*Attorney, Agent, or Firm*—Victor E. Libert; Frederick A. Spaeth

[57] ABSTRACT

A parting composition for facilitating the release of foodstuffs from cooking utensils contains an edible oil, lecithin, water, a carbonaceous, non-soap fluidizing agent. The water is present in an amount sufficient to partially, but not fully, hydrate the lecithin so as to render the partially hydrated lecithin insoluble in the edible oil. The composition, which may further include a suitable normally gaseous propellant to discharge the composition from a conventional aerosol spray can, provides a substantially clear and smooth spray coating on cooking utensils at ambient temperatures, without the need for ethyl alcohol in the composition. The composition may optionally include conventional modifying agents such as suspending agents, anti-oxidants, preservatives, flavorants, etc. The fluidizing agent, is either a glycerol ester of a fatty acid or a free fatty acid material, fluidizes the lecithin so that if the lecithin settles, it can easily be re-dispersed in the oil.

14 Claims, No Drawings

FOOD RELEASE COMPOSITIONS WITH ORGANIC FLUIDIZING AGENTS

RELATED APPLICATIONS

This application is a continuation-in-part of application Ser. No. 07/787,193, filed Nov. 4, 1991, entitled "Food Release Compositions", now U.S. Pat No. 5,374,434.

BACKGROUND OF THE INVENTION

1. Field of the Invention

The present invention relates to parting compositions for foodstuffs and, in particular, to lecithin/edible oil parting compositions which may be free of monohydric aliphatic alcohols such as ethyl alcohol. The parting composition of the invention may be dispensed from conventional aerosol spray cans to provide a smooth, clear coating on the cooking surfaces of cooking utensils.

2. Background and Related Art

The prior art has devoted considerable effort to providing lecithin-containing food parting compositions which do not discolor foodstuffs or impart undesirable flavors to them, and which may be applied to the cooking surfaces of cooking utensils from a conventional pressurized aerosol dispenser in a clear, smooth, i.e., non-foaming, coating.

The coating, which may be used in lieu of oils, grease, butter, etc., to luibricate the food-contacting surfaces of cooking utensils such as frying and baking pans, facilitates separation of the cooked foodstuffs from the cooking surfaces. The use of lecithin is of course well known for this purpose and conventional food release compositions comprise a mixture of lecithin, a naturally-occurring substance usually derived from soybean oil, an edible oil and other known additives.

One approach taken by the prior art is to incorporate ethanol, i.e., ethyl alcohol, in a lecithin-vegetable oil mixture which is pressurized by a suitable propellant gas such as a hydrocarbon gas. This approach is exemplified in U.S. Pat. No. 4,188,412 of V. D. Sejpal, which provides for the inclusion of 7.5 to 25 percent by weight of ethyl alcohol (190° to 200° proof) in a lecithin-vegetable oil mixture which is pressurized by a hydrocarbon propellant for aerosol dispensing. This composition is stated to provide a suitably low viscosity for the mixture in a uniform, one-phase system, and renders even high concentrations of lecithin in the composition suitable for dispensing from aerosol containers in a clear, non-foaming manner. The ethyl alcohol is described as reducing the viscosity of the mixture and acting as an emulsifier (column 2, lines 11–32). The Patente states that the stated limits for ethyl alcohol are critical to avoid undesirable foaming characteristics of the product and that 190° proof alcohol can be substituted for 200° proof alcohol. At the described critical range of 7.5 to 25 percent alcohol, the use of 190° proof alcohol will introduce 0.57 to 1.9 percent moisture into the composition. (See columns 11–12 of the Patent.)

U.S. Pat. No. 4,142,003 to Sejpal discloses non-aerosol vegetable oil compositions containing lecithin and 1 to 15 percent by weight ethyl alcohol. In TABLE 4 of the Patent, two sets of formulations comprising, variously, 3 or 12 percent lecithin, 82 or 73 percent soybean oil and 1 or 15 percent ethyl alcohol of from 50° to 190° proof are disclosed. The Patentee notes (column 4, lines 1–3) that 180° and lower proof alcohols cannot be utilized, presumably because of the resulting excess water content. TABLE 4 shows that use of lower proof alcohols results in separated, unclear products. At column 4, lines 7–33, the Patentee discloses upper limits for the amount of water introduced by the alcohol when 190° proof ethyl alcohol is used. The upper limit is given as about 0.60 percent by weight of water for a vegetable oil-ethyl alcohol formulation containing 12 percent by weight of lecithin, and about 0.4 percent by weight of water if the formulation contains 3 percent by weight of lecithin. The Patentee continues to note that "Within these critical limits, ethyl alcohol of somewhat less than 190° proof may be utilized in reduced amounts.". Because of these stringent upper limits on the amount of water which can be tolerated in the composition, the Patentee states that ". . . it is preferred that the ethyl alcohol be at least 190° proof.".

U.S. Pat. No. 4,163,676 issued. to K. S. Konigsbacher discloses a pump-dispensable lecithin-based parting composition which comprises lecithin in an essentially anhydrous vehicle consisting essentially of a monohydric aliphatic alcohol having two or three carbon atoms, i.e., ethyl alcohol or propyl alcohol, and vegetable oil in proportions to provide a pump-sprayable consistency. This Patentee discloses that the presence of water tends to aggravate consistency problems and is desirably minimized in the composition to provide a maximum water content below that amount which forms a constant boiling mixture with the alcohol being used. (See column 1, line 59 to column 2, line 3 of the Patent.)

Another approach demonstrated in the prior art to attain the objective of a dispensable (by aerosol or otherwise) composition which provides a smooth, clear coating is to employ a water-in-oil emulsion of lecithin as exemplified in U.S. Pat. No. 3,896,975 to D. W. Follmer. Follmer discloses such a composition utilizing three major types of naturally occurring lecithin so as to have a hydrophile-lipophile balance number ("HLB") of not more than seven. (The HLB number is defined at column 4, line 52 et seq of the Patent.) The water-in-oil emulsion of the Follmer Patent may also comprise so-called "edible detergents" (column 6, lines 56 through column 7, line 6). The "edible detergents" include glycerol monostearate, glycerol monooleate, propylene glycol monolaurate and polyethylene glycol fatty acid esters such as polyethylene glycol monolaurate, among others. The composition may be dispensed from a pressurized container through the use of a propellant (column 7, lines 7–23).

U.S. Pat. No. 3,661,605 issued to L. R. Rubin et al discloses an aqueous aerosol composition comprising a homogenized dispersion of hydroxylated lecithin in water. The Follmer Patent, described above, states at column 1, line 62 et seq that the use of hydroxylated, adulterated lecithin was resorted to in the Rubin et al Patent in order to obtain mixing of the lecithin with water adequate to prepare a water-based system. The Follmer Patent also states (column 1, line 41 et seq) that ". . . lecithin is uniquely effective, if not chemically adulterated as by hydroxylation to lose lubricity, because in addition to its lubrication qualities it is a naturally occurring material. . .".

Other examples of water-in-oil/lecithin emulsions for use as food parting compositions include U.S. Pat. Nos. 4,073,411 and 4,073,412 to C. Doumani.

Another composition containing water as a major-component is shown in Japanese Patent J5 4038-282 dated Mar. 22, 1979 which appears (from its English language Abstract) to disclose a scorch inhibitor comprising 6 to 55 percent edible oil, 1 to 48 percent lecithin, 40 to 94 percent water and 0.1 to 4 percent of a polyhydric alcohol, which together constitute the base preparation.

U.S. Pat. No. 4,371,451 to Scotti et al dated Feb. 1, 1983 discloses lecithin-containing surface release compositions comprising 7 to 60 percent water, 3 to 15 percent lecithin and 30 to 85 percent dimethylether, which serves as the propellant.

It is a known practice in the production of commercial lecithin to add limited quantities of free fatty acids as thinning agents to reduce the viscosity of the lecithin and to standardize the pH of the lecithin product.

SUMMARY OF THE INVENTION

Generally, the present invention relates to an improvement to parting compositions comprising lecithin, a quantity of water limited as described herein, an edible oil vehicle and a pressurized, normally gaseous propellant, without foam-suppressing quantities of monohydric aliphatic alcohols. In such compositions, the lecithin is, ideally, dispersed in emulsified form throughout the edible oil vehicle. However, the Applicants have found that, over time, the lecithin in some such compositions can congeal at the bottom of the container, sometimes giving way to gel formation, rendering the composition unacceptable for use. As previously disclosed in U.S. Ser. No. 07/787,193, the Applicants found that the addition of silica or certain soaps such as calcium and magnesium stearates, palmitates and myristates could be added to lecithin-containing parting compositions as suspending agents to help suspend the lecithin in the oil and thus to prevent gelation. However, soaps have a distinctly unpleasant taste, and silica can pose processing problems due to its particulaten nature and is disfavored by some purchasers because of its inorganic composition. The present invention inhibits gelation iand avoids the use of soaps by incorporating into the composition organic, non-soap fluidizing agents that are effective to inhibit the lecithin from congealing in the edible oil vehicle upon standing after the composition is prepared. Accordingly, should the lecithin settle in the edible oil. vehicle, the lecithin in the composition is easily re-dispersed, e.g., by-shaking the container.

Specifically, the present invention relates to an aero-soldispensable foodstuffs parting composition for coating cooking surfaces that may be combined with a pressurized, normally gaseous propellant suitable for discharging the composition as an aerosol spray. The composition consists essentially of leithin, water and a fluidizing agent dispersed in an edible oil vehicle. The weight of the edible oil vehicle present in the composition exceeds the combined weight of the lecithin and the water present. The water is present in an amount which is sufficient to partially, but not fully, hydrate the lecithin to an extent that solubility of the lecithin in the edible oil is sufficiently reduced so that aerosol-dispensed coatings of the composition are rendered non-foaming and clear at ambient temperatures. The fluidizing agent is present in an amount sufficient to inhibit the lecithin from congealing in the edible oil vehicle.

According to one aspect of the invention, the fluidizing agent comprises a free fatty acid material, which preferably comprises one or more $C_{12}$ or higher fatty acids, e.g., one or more $C_{12}$ to $C_{20}$ fatty acids. Such fatty acids may be selected from the group consisting of lauric acid, linoleic acid, oleic acid, stearic acid, palmitic acid, myristic acid, free fatty acid materials derived from edible plant and animal fats and oils, and combinations thereof.

According to another aspect of the invention, lecithin may comprise fromabout 1.0 to 25 percent by weight of the composition, and the free fatty acid material may comprise from about 0.05 to about 8.0 percent by weight of the composition, e.g., from about 0.1 to about 2.0, or, alternatively, from about 0.4 to about 5.0 percent by weight of the composition.

According to still another aspect of the invention, the fluidizing agent may comprise one or more glycerides, such as glycerol esters of fatty acid materials, e.g. a polglycerol oleate or an acetylated monoglyceride, or combinations thereof. The glyceride may comprise from about 0.4 to about 5.0 percent by weight of the composition.

According to, still another aspect of the invention, the composition may be substantially free of monohydric aliphatic alcohols.

Yet another aspect of the invention provides that the lecithin may have a known phosphatide content and the lecithin and water are present in amounts to provide a percent relative water content ("percent RWC"), which is calculated by dividing the weight of water in the composition by the sum of the weight of water plus phosphatides in the composition, and multiplying the result by 100, of from about 21 to 61 percent RWC. For example, the percent relative water content may be from about 25 to 57 percent RWC.

Generally, the lecithin may comprise from about 1 to 25 percent by weight of the composition.

The invention also provides a method for preparing a food parting composition as described by combining lecithin with a fluidizing agent, and further combining water with the lecithin in an amount sufficient to partially but not fully hydrate the lecithin. The fluidized, partially hydrated lecithin is then mixed into an edible oil vehicle, the weight of the edible oil vehicle exceeding the combined weight of the lecithin and water, and the mixture is placed in an aerosol dispenser with a normally gaseous propellent suitable for discharging the composition in an aerosol spray.

As used herein and in the claims, the term "percent by weight" used withreference to a particular component means the weight of that component in the composition divided by the total weight of the composition, including that of the particular component, with the result multiplied by 100.

As used herein and in the claims, the term "modified lecithin" refers to chemically modified lecithins, especially acetylated and hydroxylated lecithins. Reference herein and in the claims to "lecithin" is a broad term including standard lecithin and modified lecithin. The defined terms have the indicated meanings whether employed in the singular or plural forms. Further, unless specifically otherwise stated, all references in this specification and in the claims to amounts of "lecithin" or "lecithin component" whether expressed as percent by weight, or otherwise, refer to amounts of lecithin calculated as unhydrated lecithin. Thus, the amounts of lecithin are specified independently of water content, whether the water is present as free water or as water of hydration of the lecithin, or both.

As used herein and in the claims, the term "free fatty acid material" is meant to encompass specific free fatty acids as well as combinations thereof, including mixtures of free fatty acids that may be derived from plant or animal fats or oils.

Reference is made in the following description to the clarity of coatings obtained by dispersing a spray of the parting composition of the invention onto a surface. Such coatings may have objective clarity in that they have substantially the clarity of water, or they may have apparent clarity when sprayed on an opaque surface such as stainless steel even though, if sprayed upon a clear glass surface, they may display a very slight, albeit noticeable, haziness. It will be appreciated that apparent clarity is commercially acceptable inasmuch as, upon being applied as a spray coating to an opaque surface, it does not differ noticeably to the eye from a coating which has objective clarity. Therefore, spray coatings which are described as having slight haziness may nonetheless have apparent clarity when sprayed onto opaque surfaces and may thus be commercially acceptable. Accordingly as used in the claims, reference to a "clear" coating means and includes coatings which have either objective Or at least apparent clarity.

Other aspects of the present invention are disclosed in the following detailed description of the invention and of certain embodiments thereof.

DETAILED DESCRIPTION OF THE INVENTION AND CERTAIN EMBODIMENTS THEREOF

The food parting or food release compositions of the present invention are useful for preventing sticking of cooked foodstuffs to the cooking utensils, thereby facilitating the removal of the foodstuffs from, and cleaning of, the cooking utensils. In a preferred embodiment, the parting composition is packaged in a conventional aerosol spray can including a suitable normally gaseous propellant for discharging an aerosol spray of the parting composition onto the food-contacting surfaces of cooking utensils. Other dispensing means such as hand-pumps or squeeze spray packages may of course be used. The spray coating produced by parting compositions according to the present invention are generally clear, i.e., transparent or translucent, and substantially free of foam. Reference below to "parting compositions" or "compositions", unless otherwise specified, will mean food release or parting compositions containing lecithin and edible oil.

Lecithin

Any suitablei lecithin, including commercially available standard lecithins and modified lecithins, and combinations thereof, may be uised in compositions according to this invention. Although lecithin is obtainable from both soybeans and from egg yolk, most commercially available lecithins are made from soybeans and are available both in liquid form, usually dissolved in soybean or other edible oil, or in dry powdered form. Food grade lecithins are typically obtained from soybeans by mixing soybean oil with water, which hydrates the lecithin and renders it substantially insoluble in the soybean oil, thereby permitting centrifugal separation of the hydrated lecithin from the oil. The separated lecithin may be dried to provide a lecithin powder or redissolved in a suitable edible oil to provide the lecithin in liquid form.

Lecithin is a complex mixture of acetone-insoluble phosphatides comprised mostly of phosphatidylcholine and lesser amounts of phosphatidylethanolamine and phosphatidylinositol. The levithin is comprised of the phosphatides and varying amounts of other materials such as triglycerides, fatty acids and carbohydrates. Commercially available lecithins are available containing the above components in various combinations and proportions, usually containing from about 50 to 65 percent by weight of acetone-insolubles (phosphatides). In liquid form, the lecithin is usually dissolved in soybean oil and is available in different viscosities. The lecithin may be unbleached or, in order to lighten its color, it may be bleached, usually by peroxides, and may be filtered or otherwise refined. Such treatments do not chemically alter the phosphatide content of the lecithin and, as used herein and in the claims, the term "standard lecithin" means and includes any lecithin, whether crude, refined, fiiltered and/or bleached, provided that the lecithin, or at least the phosphatide content thereof, is not chemically modified by reaction of its functional groups.

Lecithin contains different functional groups that make it reactive in a number of chemical reactions. Chemically modified lecithins include lecithins which have been acetylated, hydroxylated, hydrolyzed, hydrogenated, halogenated, phosphorylated and sulfonated, among other treatments. However, insofar as significant quantities of commercially available chemically modified lecithins are concerned, only acetylated and hydroxylated lecithins are widely commercially available.

When mixed with water lecithin will become hydrated as discussed in detail elsewhere herein. Such hydrated lecithin is considered, and is defined herein, as a standard lecithin, that is, hydration of the lecithin is not considered to comprise chemical modification of it.

Generally manufacturers of commercial lecithins add small amounts of fatty acids to their products in order to produce end product lecithins that have consistent pH values and/or to controlS the viscosity of the lecithin. Since lecithins naturally contain varying quantities of fatty acids, the amounts of fatty acids added by the lecithin manufacturers varies as well. However, as discussed below, despite the presence in commercial lecithins of these small quantities of free fatty acids, the Applicants have found that when used in parting compositions, the lecithin can gel and become difficult to re-disperse in the edible oil vehicle unless a fluidizing agent is added as taught herein. Generally, lecithin comprises from about 1 to about 25 percent by weight of the composition, typically about 6 percent.

Edible Oil

Any suitable edible oil or mixture of edible oils may be used in compositions according to the present invention. Such oils include, by way of example and not by way of limitation, canola, partially hydrogenated winterized canola, corn, olive, peanut, cottonseed, safflower, soy, partially hydrogenated winterized soy, and sunflower oils. The edible oil component generally constitutes the largest single component of the food parting composition and serves as the vehicle for the lecithin, water and any other ingredients. Corn oil and canola oil have yielded particularly good results with respect to transparency, fluidity, taste and release performance.

Propellant

Any suitableipropellant acceptable for use in food products may be usedin connection with the present invention. For example, by way of illustration and not limitation, conventional hydrocarbon propellants such as commercially available mixtures of butane, isobutane and propane are suitable, as are dimethyl ether, carbon dioxide, nitrous oxide and normally gaseous fluorocarbons. However, as environmental concerns grow and related emissions control standards become more stringent, it is advantageous to choose propellants from among those which are exempt from controlling regulations, such as regulations relating to Volatile Organic Compounds and promulgated by the Air Resources Board of the State of California, Stationary Source Division. Such exempt propellants include, by way of example, 1,1- difluoroethane (HFC-152a), trifluoromethane (HFC-23), and tetrafluoroethane (HFC-134a). Other acceptable although non-exempt propellantS include, for example, propane, isobutane, n-butane, and mixtures thereof. The propellant, which may be present in the formulation as a pressurized gas, a liquified gas and/or a soluble gas dissolved in the liquid component of the composition, is present in an amount at least sufficient to facilitate the delivery of an acceptable quantity of the parting composition from a pressurizable container, i.e., from a conventional aerosol spray can. Typical proportions of propellant may range from about 10 to 75 percent by weight of the composition, and are preferably from about 15 to 50 percent by weight of the composition, although other quantities may be used.

Generally, liquifiable compressed gas propellants are hydrocarbons including propane, isobutane and n-butane, closely related dimethylether and fluorinated hydrocarbons such as difluoroethane (HFC-152), trifluoroethane (HFC-143B), tetrafluoroethane (HFC-134A), trifluoromethane (HFC-23) and mixtures thereof. The code numbers given in parentheses are product grades used by E.I. DuPont de Nemours and Company, a manufacturer of fluorinated hydrocarbon gases. Gaseous propellants that are non-liquifiable gases under conditions of usei in low pressure aerosol dispensers include carbon dioxide, nitrous oxide, nitrogen and other non-reactive gases whose boiling points are at or below about –100° F. These non-liquifiable gases would be limited to about not more than about 4 percent by weight of the formulations if packaged in conventional low pressure aerosol spray cans conventionally used for food release or parting composition products. Further, spray patterns with conventional and commercially utilized low pressure aerosol valves would be extremely poor. However, the provision of appropriate valves would permit suitable spray patterns with non-liquifiable gasesused as the propellant. The propellants employed in all the Examples and referred to in all the TABLES of this application are liquifiabe compressed gas propellants comprising hydrocarbons, i.e., propane, isobutane and n-butane or mixtures of two or more thereof. The quantities of propellant referred to in the claims are such hydrocarbon propellants.

Water Content

The amount of water added to the composition is selected so as to partially hydrate the lecithin or, more accurately, so as to partially hydrate the phosphatide portion of the lecithin so as to render the partially hydrated lecithin insoluble in the edible oil. (Reference herein and in the claims to hydration of the lecithin will be understood to refer to hydraion of the phosphatide portion of the lecithin.) On the other hand, the amount of water added should not be so great as to fully hydrate the lecithin. Partially hydrated lecithins in parting compositions provide clear, amber colored, platelet-like materials of a viscosity which can be readily handled and dispensed through preferred means such as conventional aerosol spray cans. Insufficient water in the composition will not provide the desired degree of insolubility of the lecithin in oil to provide a readily dispersible non-foaming dispersion of lecithin in the oil. On the other hand, excessive water, in addition to contributing to problems of bacterial growth and rancidity as discussed below, will result in a milky or cloudy composition. Accordingly, in accordance with the practices of the present invention, the water content of the composition is from about 0.2 to 22 percent, preferably 0.3 to 18 percent, by weight water. Fully hydrated lecithins take on a golden yellow color but result in platelet-like globules of a very high, somewhat pasty, consistency. In accordance with the practices of the present invention, water is provided in the composition in am amount which will partially hydrate the phosphatide portion of the lecithin and render it into a somewhat (but not excessively) viscous, plastic-like material which is sufficiently insoluble in the edible oil so as to substantially eliminate foaming when the composition is sprayed onto a surface at ambient temperatures, and which is clear and transparent, or at least translucent.

The insolublie platelets of the partially hydrated lecithin are dispersed into the edible oil, and the degree of dispersion may be improved by size reduction of the platelets and the utilization of suspending agents such as fumed silica or other suitable suspending agents. Size reduction of the partially hydrated lecithin platelets may be attained by any suitable size reduction means. One convenient way to attain this size reduction for dispersion purposes is to utilize equipment of the type used for homogenization. Homogenization is conventionally attained by forcing the material to be homogenized at very high pressures through fine openings. Platelet size reduction, to attain better dispersion of the partially hydrolyzed lecithin throughout the edible oil may be accomplished by processing the mixture containing lecithin, water and edible oil in conventional homogenization equipment. Conceivably, other suitable techniques such as ultrasonic sound particle size reduction techniques could be utilized.

Generally, it is desirable to utilize as little water as possible consistent with attaining the desired non-foaming and clear chairacteristics of the composition. One reason for this is t at the water activity of the composition is significant. The addition of even small amounts of water to the composition may result in a small amount of free water in equilibrium with the water of hydration of the lecithin. Different portions of the lecithin bond the water of hydration at different levels of bonding strength and a certain amount of free water will usually be present. However, the presence of free water provides a medium for bacterial growth, especiallyl in systems which are exposed to air, which is sometimes present in industrial grades of propellants including normally gaseous hydrocarbons. Further, residual portions of a parting composition containing significant water, for example, a portion left exposed in or adjacent the nozzle of an aerosol dispenser, provide a medium suitable for bacterial growth and hydrolysis of the edible oil content to fatty acids, resulting in undesirable flavors, spoilage and rancidity.

Parting Compositions of the Present Invention

The practices of the present invention provide non-foaming, clear and smooth parting compositions, that is, food release compositions, having excellent release properties and which do not contain foam-suppressing quantities, or any, ethyl alcohol or any other monohydric aliphatic alcohol. Essentially, these excellent results are attained without the use of ethanol and without adding to the composition the quantities of water required to provide a water/oil (or oil/water) emulsion system. Such quantities of water in the composition present significant problems of release efficacy and appearance of white or opaque surface coatings. Should the lecithin in these compositions settle, it may easily be re-dispersed throughout the edible oil vehicle due to the presence of the fluidizing agents discussed below. The avoidance of the use of alcohol provides advantages over the prior art as represented by, e.g., Sejpal, U.S. Pat. No. 4,188,412, discussed above, which teaches the use of alcohol as an anti-foaming agent. For example, parting compositions containing alcohol (e.g., ethanol), lecithin and an edible oil usually present an initial foam when sprayed, the foam breaking and dissipating only subsequent to application to the cooking surface. Ethanol also has a characteristic odor not usually desired in parting compositions and is a costly ingredient. Further, the storage, use and handling of ethyl alcohol is subject to Government control and taxes, which contribute to increased costs, including accounting and record-keeping requirements. In addition, ethyl alcohol is a somewhat flammable and volatile organic composition which adds to the difficulties encountered in storage and handling of it. These disadvantages are avoided by limiting or eliminating the presence of alcohol in accordance with the present invention.

Fluidizing Agents

Parting compositions in accordance with the present invention further comprise a fluidizing agent which tends to inhibit the gelation of lecithin in the edible oil vehicle should the lecithin settle in the edible oil vehicle. Accordingly, even if the composition stands quiescent for a period long enough to allow the lecithin to aggregate in the container, an evenly dispersed composition can be re-constituted by shaking the container. The action of the fluidizing agent can be enhanced by including agitation pellets or the like in the container to bolster the shaking action.

In a preferred embodiment of the invention, the fluidizing agent comprises a free fatty acid material, i.e., one or more free fatty acids. As is known to those skilled in the art, the term "free fatty acid" refers to fatty acid compounds in their acidic state, thus excluding, e.g., glycerol esters of fatty acids. As used herein and in the claims, terms including the phrase "fatty acid" should be interpreted to exclude salt derivatives of fatty acids, i.e., soaps. Generally, it is necessary to add free fatty acid material in an amount of at least about 0.05% by weight of a typical parting composition to derive the desired fluidizing effect. Any suitable saturated or unsaturated free fatty acid material may be used, but materials comprising short-chain fatty acids, e.g., $C_8$ or lower fatty acids, are disfavored due to their tendency to produce acrid smoke during the cooking process. Preferably, the free fatty acid material comprises fatty acids having $C_{12}$ chains or longer chains, for example, $C_{12}$ to $C_{20}$. Typical fatty acids that find utility in accordance with the present invention include lauric acid, linoleic acid, oleic acid, stearic acid, palmitic acid, and myristic acid. In addition, free fatty acid materials derived from edible animal and plant fats and oils, such as from soybean oil and from coconut oil (hereinafter sometimes referred to as "soy FFA" and "coconut FFA" materials, respectively) are also useful in preparing compositions according to the present invention. Such free fatty acid materials comprise mixtures of fatty acids of various types. Other sources of free fatty acid materials include, without limitation canola oil, corn oil, cottonseed oil, palm kernel oil, peanut oil, olive oil, rice bran oil, rye oil, safflower oil, sunflower oil, wheat oil and butter. In a preferred embodiment, the fluidizing agent comprises a free fatty acid material derived from low-linolenic soybean oil.

Generally, a free fatty acid material fluidizing agent is present in not, more than about 8.0%, as in the case of coconut FFA material; i.e., the free fatty acid may be present in an amount of from about 0.05 to about 8.0% by weight of the composition. Using soy FFA material, on the other hand, the upper limit would be about 5.0%. Accordingly, in an illustrative case, a parting composition comprising sufficient lecithin ito provide acetone-insolubles in an amount of about 3.75% by weight of the composition may comprise from about 0.05% to about 5.0% added soy free fatty acid material by weight of the composition. Generally, as the proportion of acetone insolubles in the composition rises, the quantity of fluidizing agent may rise proportionately.

It has been found that some fatty acids impart bitter or soapy flavor to the parting composition when added beyond a particular quanitity. For example, free fatty acid material derived from soybean oil may contain 7% to 10% linolenic acid, which if present in significant amounts, imparts a bitter taste that suggests oxidation or rancidity. The amount or type of fatty acid material used in the composition should therefore be chosen to avoid imparting an unpleasant taste to the parting composition. Generally, it is preferred to limit the quantity of free fatty acids to avoid imparting a soapy, bitter or otherwise unpalatable taste to the composition. This usually means limiting the amount of free fatty acid to about 5 percent by weight of the composition. For example, the free fatty acid material may be added in a quantity of from about 0.1% to about 2.0%, or, more specifically, from about 0.2% to about 1.0% by weight of the composition. In addition, fatty acid materials may be combined or diluted with others to alleviate undesireable characteristics. For example, it has been found that soy FFA material can be advantageously combined with coconut FFA material. The resulting mixture can be used in efficacious quantities in parting compositions according to the present invention, to dilute the unpleasant taste of the linolenic acid in the soy FFA material, without imparting an unacceptably soapy taste to the composition. Typically, the soy FFA material and the coconut FFA material are mixed in proportions ranging from 1:1 to 1:3 or even 1:9, respectively. The incorporation of such a mixture into a parting composition is effective to inhibit gelation of the lecithin even if the lecithin settles. Preferably, the soy FFA material is limited to not more than about 0.2 to 0.4% by weight of the parting composition to avoid undesireable taste, regardless of the presence of coconut FFA material, and coconut FFA material is limited to not more than about 1.0% by weight, to avoid imparting a undesireable taste to the composition. Coconut FFA material is preferably limited to amounts of not more than about 0.3 to 0.5% by weight of the composition, to avoid smoke production.

It is believed that by processing coconut oil to remove the lower chain fatty acids, i.e., lower than about $C_{10}$, e.g., by steam-stripping the coconut oil from which the coconut FFA material is derived, the resulting coconut FFA material can be used in greater quantities without making the parting composition vulnerable to smoking.

When fatty acids are esterified on a glyceride molecule, e.g., as a mono- or polyglyceride., their taste attributes appear to be significantly reduced. Specifically, the Applicants have discovered that polyglycerol oleate, a polyglycerol ester of a fatty acid, can be used as a fluidizing agent in accordance with the present invention without adversely affecting the taste of the parting composition, whereas an equivalent amount of oleic acid m parts a soapy taste to the composition. Similarly, an acetylated monoglyceride, i.e., the acetylated monoglyceride derived by partial de-esterification of soybean oil, can also be employed in this manner without imparting an unpleasant taste to the composition. One such monoglyceride is commercially available under the triade designation MYVACET 9-45. Like free fatty acid materials, these mono- and polyglyceride fluidizing agents are generally present in the composition in an amount of about 0.4 percent to about 5.0 percent by weight.

Preparation of the Parting Composition

The parting compositions of the invention may be prepared by any suitable technique. Generally, the lecithin and fluidizing agent are admixed before adding water, for example, a liquid lecithin comprising lecithin dissolved in soybean oil is admixed with fatty acid material, followed by addition of water, resulting in the formation in the oil of platelets of partially hydrated lecithin. The action of the fluidizing agent towards rendering the lecithin resistant to gelation can be enhanced by reducing the size of the platelets, e.g., by mixing. Such mixing is conveniently carried out in homogenization equipment which forces the mixture of partially hydrated lecithin and edible oil under high pressure through very small openings to reduce the size of the platelets. At least on a laboratory scale, a hand-operated homogenizer manufactured by Chase-Logeman Corporation of Hicksville, N.Y. is suitable for this purpose. This equipment can develop a maximum rated force of 1,000 pounds per square inch. Another suitable piece of homogenization equipment is a type KU1 homogenizer, manufactured by Erweka Apparatbau GmbH. This equipment, operated at full capacity at setting 1, will produce a force of 1,000 to 1,500 pounds per square inch. Another suitable piece of homogenization equipment is a two-stage homogenizer with a maximum operating pressure of 5,000 pounds per square inch, manufactured by APV Gaulin, Inc. of Wilmington, Mass.

A typical preparation of the parting compositions in accordance with the present invention is as follows. All of the formula fluidizing agent is added to all the formula lecithin and the two are mixed. The amount of water appropriate to partially hydrate the fluidized lecithin is added with mixing and the formula oil is then added to complete the formulation. The formulation is homogenized by mixing with a conventional motor-driven stirrer blade to assure that the lecithin is hydrated by the water. When all these ingredients are uniformly mixed along with any other formula components, the formulation is then mixed to reduce the platelet size, e.g., in homogenization equipment at 1,000 to 5,000 p.s.i. Mixing is continued even after the desired platelet size is achieved, until the material is placed into aerosol dispenser cans, to prevent separation of the partially hydrated lecithin. Usually, preparation of the composition is carred out at ambient temperatures, generally from about 21° to 32° C. (70° to 90° F), preferably at a temperature of from about 24° to 27° C. (75° to 80° F). In some cases, depending on the particular formulation employed, continued or periodic mixing may be necessary to insure that all ingredients remain uniformly suspended and dispersed in the formulation. The skilled practitioner will be aware of suitable techniques which may be employed in order to attain the desired dispersion of lecithin and other ingredients in the edible oil.

All references in the TABLES and Examples below, or elsewhere herein, to "%" or "percent", mean percent by weight. as defined above, unless otherwise specifically noted.

EXAMPLE 1

A series of parting compositions in accordance with the present invention was prepared to illustrate the operability of compositions ccording to the present invention. The compositions prepared for this Example comprised lecithins indicated in TABLE I below in amounts to provide 3.75% acetone insolubles; 1.8% water; 18% hydrocarbon propellant; the indicated fluidizing agent in the amount indicated in the TABLE; and edible oil. All the lecithins were produced by their manufacturers in processes that included the addition of fatty acids.

The ratings of 0 to 3 in TABLE I indicate the ease with which settled lecithin was re-dispersed by shaking the container after the lecithin settled, 3 being the best rating.

TABLE I

| Formula | Fluidizing Agent | Kind[1] of Lecithin | Amount of Fluidizing Agent (wt %) | Results[2] |
|---|---|---|---|---|
| E1-1 | lauric acid | R, N, B | 0.2 | 2 |
| E1-2 | oleic acid | M | 0.3 | 2 |
| E1-3 | soy FFA[3] | R, N, B | 0.5 | 3 |
| E1-4 | coconut FFA[4] | N, P, S | 0.5 | 3 |
| E1-5 | oleic acid/ soy FFA (1:1) | M | 0.1 | 2 |
| E1-6 | stearic acid | R, N, B | 0.15 | 0 |
| E1-7 | FFA mixture (palmitic, stearic, oleic acids) | R, N, B | 0.2 | 0 |
| E1-8 | FFA mixture (stearic, palmitic acids; 1:1) | R, N, B | 0.2 | 1 |
| E1-9 | FFA mixture (stearic, myristic, oleic, lauric acids) | R, N, B | 0.2 | 1 |
| E1-10 | Coconut FFA | R, B | 0.5 | 3 |
| E1-11 | Coconut FFA | R, O | 0.5 | 1 |
| E1-12 | Coconut FFA | R, A | 0.5 | 3 |
| E1-13 | FFA mixture (soy FFA and coconut FFA; 1:1) | N, F, S | 0.4 | 3 |
| E1-14 | FFA mixture (soy FFA and coconut FFA; 2:3) | N, R, B | 0.5 | 3 |
| E1-15 | FFA mixture (soy FFA and coconut FFA; 1:3) | N, R, B | 0.6 | 2 |
| E1-16 | polyglycerol oleate | N, F, S | 0.4 | 3 |
| E1-17 | acetylated[5] monoglyceride | N, F, U | 2.0 | 3 |

[1]Kind of lecithin: N = natural; R = refined; M = modified chemically; P = plastic, U = unbleached; S = single bleached; B = custom-blended; O = oil-free custom-blended.
[2]Observed effectiveness fluidizing agent relative to non-fluidized compositions: 0 = not at all; 1 = slightly; 2 = moderately; 3 = very well; 4 = exceptionally.
[3]Soy FFA = free fatty acid material derived from soybean oil.
[4]Coconut FFA = free fatty acid material derived from coconut oil.
[5]MYVACET 9-45

It can be seen from TABLE I that the addition of the fluidizing agents to food parting compositions in accordance with the invention is effective to render the lecithin therein re-dispersible in the edible oil vehicle. The lecithin in comparative compositions not comprising added fluidizing agents was generally found to form a gel when the composition was allowed to stand and was not readily re-dispersible as were the compositions according to the invention.

EXAMPLE 2

A series of parting compositions according to the present invention were prepared and tested to confirm their effectiveness. The compositions each comprised sufficient standard lecithin to comprise 3.75% acetone insolubles; 0.5% of the fluidizing agent indicated in the following TABLE; 1.8% water; 18% hydrocarbon propellant and the balance edible oil.

The release characteristics of these compositions were evaluated by calculating an average release value obtained for blueberry muffins baked in the muffin pans spray-coated with the various parting compositions prior to the batter being deposited therein.

Each composition was tested twice by spraying it onto a clean aluminum muiffin pan having twelve individual cavities measuring one and seven eighths inches, equivalent to 4.8 centimeters ("cm") in diameter at the top, one and one-quarter inches (3.2 cm) in diameter at the bottom and three quarters of an inch (1.9 cm) in depth. The various formulations were applied to the pan by spraying in a circular fashion to favor the deposition of a uniform coating on the pan surface. The pan was then filled with batter prepared from a JIFFY bra d blueberry muffin mix, but for the addition of ½ teaspoon powdered buttermilk and one large egg, and by the omission of all milk while adding ¼ cup of water. In each test approximately the same amount of batter was spooned into each cavity of the pan. Once the pan was filled with batter, it was placed in an oven preheated to 350° F. The muffins were baked in this temperature for fifteen minutes. In each case, after the baking period, the pans were removed and allowed to cool for five minutes at room temperature. The pans were then inverted to an upside down position to see if any of the muffins fell out, and the results were noted. While inverted, the pan was shaken once to see if additional muffins fell out, and the results were noted. The shakes were repeated one at a time until the upsides down pan was subjected to ten shakes and the number of muffins that fell out in each shake was recorded. At the end of ten shakes it was noted how many muffins, if any, remained in the pan.

The observations made during the shake procedure were quantified by assessing "points" according to the total number of shakes required to dislodge the muffins as follows. For each muffin which fell out of its cavity upon the initial inversion of the pan without shaking, 0 points was charged; thereafter, each cavity accrued one point for each shake required to dislodge the muffin baked in it. The release values assigned each formulation is equal to the sum of points charged to the cavities in the pan divided by the number of cavities. Consequently, the lower the release number is, the more effective is the parting composition. The results are set forth in TABLE II.

TABLE II

| Formula | Fluidizing Agent | Lecithin Type(3) | Release Value |
| --- | --- | --- | --- |
| E2-1 | soy FFA(1) | R, B | 0.96 |
| E2-2 | coconut FFA(2) | N, S | 0.54 |
| E2-3 | coconut FFA | N, P | 1.37 |
| E2-4 | coconut FFA | N, P | 4.58 |
| E2-5 | soy FFA | N, S | 4.54 |
| E2-6 | soy FFA | N, P | 1.08 |

TABLE II-continued

| Formula | Fluidizing Agent | Lecithin Type(3) | Release Value |
| --- | --- | --- | --- |

(1)Soy FFA - free fatty acid material derived from soybean oil.
(2)Coconut FFA - free fatty acid material derived from coconut oil.
(3)Kind of lecithin: N = natural; R = refined; P = plastic; S = single bleached.

The data of TABLE II illustrate that food parting compositions comprising various standard lecithins and fluidizing agents in accordance with the present invention are effective to facilitate the separation of foodstuffs from cooking surfaces.

EXAMPLE 3

A series of food parting compositions were prepared in accordance with the present invention, using a natural, single-bleached ecithin to which no fatty acids had been added in the course of manufacture. This type of lecithin was chosen so that the total fatty acid content of the compositions would be known. In these compositions, equal weights of soybean FFA material and coconut FFA material were incorporated into the compositions in amounts constituting from 0.3% to 10% by weight of the composition. The amounts of water added to the composition was also varied, as shown in the following TABLE. The compositions were placed with pressurized propellants in glass bottles, and were allowed to remain quiescent for one week at ambient temperatures. The bottles were inverted to see whether the settled lecithin would float free and then the bottle was shaken gently to determine how easily the lecithin was redispersed in the composition. Samples were taken to evaluate the taste characteristics of the compositions. The fluidizing agent in the last two compositions in the TABLE comprised only coconut free fatty acid material. All of the compositions listed in TABLE III comprised 6% natural, fluid, single-bleached lecithin having 62.5% acetone insolubles; the indicated quantities of the fluidizing component and water; 18% hydrocarbon, and balance corn oil. The results are set forth below in TABLE III.

TABLE III

| Composition | F A(1) (% by weight) | Water (% by weight) | Composition Clarity | Lecithin Dispersion | Taste |
| --- | --- | --- | --- | --- | --- |
| E3-1 | 0.3 | 1.6 | opaque | fluid, not adherent to glass | bland |
| E3-2 | 0.3 | 1.8 | opaque | fluid, slight adherence to glass | bland |
| E3-3 | 0.3 | 2.0 | opaque | plastic, breaks into clumps before dispersing, slight adherence to glass | bland |
| E3-4 | 0.4 | 1.6 | transparent | plastic, very adherent to glass | faint soapy |
| E3-5 | 0.4 | 1.8 | transparent | fluid, slight adherence to glass | faint soapy |

TABLE III-continued

| Composition | F A[1] (% by weight) | Water (% by weight) | Composition Clarity | Lecithin Dispersion | Taste |
|---|---|---|---|---|---|
| E3-6 | 0.4 | 2.0 | translucent | plastic, breaks into clumps before dispersing, very adherent to glass | faint sharp |
| E3-7 | 0.5 | 1.6 | translucent | fluid, slight adherence to glass | faint sharp |
| E3-8 | 0.5 | 1.8 | translucent | fluid, slight adherence to glass | slight oxidized |
| E3-9 | 0.5 | 2.0 | opaque | plastic, disperses w/ moderate difficulty, very adherent to glass | slight soapy |
| E3-10 | 1.0 | 1.6 | translucent | fluid, slight adherence to glass | slight oxidized |
| E3-11 | 1.0 | 1.8 | translucent | fluid, no adherence to glass | slight oxidized |
| E3-12 | 1.0 | 2.0 | transparent | fluid, slight adherence to glass | oxidized |
| E3-13 | 5.0 | 1.8 | opaque | plastic, slight adherence to glass | soapy |
| E3-14 | 10.0 | 1.8 | opaque | solid precipitate, disperses as permanent clumps & adheres to glass, foamed when sprayed | soapy |

[1]Fluidizing Agent

In each case, unless indicated otherwise, the lecithin was easily re-dispersed once it had broken free of the mass of settled, hydrated lecithin after being subjected to mild shaking and produced a foamless spray. The tendancy for lecithin to adhere to the glass container is interpreted as an early stage of gelation that if continued might result in adherence of the total mass of hydrated lecithin to the container (glass) as an adherent gel. Only Sample E3-14 was completely unacceptable for its inability to re-disperse the lecithin and for its undesireable, soapy taste. Sample E3-13 had a distinctly soapy taste but showed good characteristics with respect to re-dispersion. The data of TABLE III show that free fatty acid materials can be used with lecithins to which no fatty acids were previously added to yield superior food parting compositions. Since the range of quantities of fatty acid material added in the compositions described in TABLE III generally correlate with the ranges in the other examples, and since the performances of the commercial lecithin compositions and the acid-free lecithin compositions were comparable, these data show that by adding free fatty acid material to food parting compositions in accordance with the present invention, the fluidity of the composition is improved, irrespective of the addition to the lecithin of fatty acids by the manufacturer.

EXAMPLE 4

A variety of comparative formulations were prepared with varying proportions of lecithin component to determine whether variations in lecithin content affected the minimum amount of water needed to prevent foaming. Without wishing to be bound by any particular theory, it is hypothesized, as described above, that foaming is inhibited when the phosphatide portion of lecithin is partially hydrated to a certain degree, less than fully hydrated. It is believed that small amounts of water serve to hydrate the phosphatide portion of ecithin and have a beneficial effect on the foaming characteristic of spray coatings of the composition as well affecting the clarity of the composition.

The following discussion attempts to correlate lecithin hydration with non-foaming and transparency features of aerosol-spray coatings of parting composition formulations. Although the compositions prepared for this example do not comprise a fluidizing agent as taught herein, the information derived from these compositions is believed to be pertinent to compositions according to the present invention because the addition of the fluidizing agents as described herein has not been observed to affect the hydration or solubility properties of lecithin.

Phosphatidyl holine and lesser amounts of other phosphatides compries a principal component of lecithin. These phosphatides are hydrated by water and the degree of such hydration is believed to determine the unique non-foaming (smooth) and clear (transparent) characteristics of the spray coatings which are the subject of this invention. Phosphatidylcholine is a water insoluble, Class II, polar lipid that is capable of forming liquid crystalline phases. Molecular phosphatidylcholine swells when water contacts the hydrophilic, zwitterionic phosphatidylcholine portion of the molecule even though the diacylglycerol portion of the lecithin molecule is hydrophobic. At very low concentrations of water, phosphatidylcholine has a crystalline form hydrated with 1 or 2 water molecules per molecule of phosphatidylcholne. In this form, phosphatidylcholine is in a mono- or dihydrate crystalline form with water tightly bound thereto. Apparently, when crystalline lecithin is incorporated int an aerosol pan spray, the resultant spray coating foams excessively and the foam interferes with performance of the product.

As the crystalline phosphatidylcholine contacts additional small amounts of water, it swells and forms a fluid, clear phase. Formation of chain-like, lamellar liquid crystals seems to accompany increasing hydration. At low concentrations of water both crystalline and lamellar forms of phosphatidylcholine appear to coexist. The combination of these hydrated forms in the proper ratio is believed to provide both (1)the clear lecithin phase and (2) the lamellar bilayer responsible for the transparent and non-foaming spray coat, respectively. As the water content of the lecithin increases, tightly bound water increases to a maximum of 9 to 13 molecules per phosphatidylcholine molecule. The hydrophilic, zwitterionic head portion of the phosphatidylcholine molecule containing choline and phosphoric acid may continue to take on water molecules which are less tightly bound, or "free", and may continue to swell until a maximum degree of hydration is reached somewhere between about 22 to 29 total water molecules. Discussions of the hydration of phosphatidylcholine can be found in the following references, the disclosures of each of which are incorporated by reference herein. Small, D. M. 1986, *Handbook of Lipid Research*, Volume 4; *The Physical Chemistry of Lipids*, Plenum Press. N.Y.; and Szuhaj, B. F. and G. R. List, 1985, *Lecithins* (AOCS Monograph 12), Amer. Oil Chemist's Soc., Champaign, Ill.

Charged phosphatides which may be present in lecithin, including phosphatidylethanolamine and phosphatidylinositol, undergo hydration (in the phosphate region) as well, but to a lesser extent than does phosphatidylcholine.

Since the data of TABLE IVI below suggest that the relationship between the amount of water and the amount of phosphatidylcholine in the parting composition is a dominant factor in determining the appearance of spray coatings according to this invention, it will be convenient to define a measure of water content relative to the phosphatide content of the formulation. This will take into account the somewhat differing phosphatide content of different lecithins. This measure is thus defined as the weight of water in the formulation divided by the total weight of water and phosphatides in the formulation, multiplied by 100. Such measure of water content will be given herein and in the claims as "percent relative water content" abbreviated as "percent RWC" and may be expressed as a mathematical formula, as follows:

$$\text{Percent } RWC = \frac{\text{weight of water}}{\text{weight of (water + phosphatides)}} \times 100 \qquad \text{(I)}$$

The value of percent relative water depends only on the respective relative weights of water and total phosphatides in the compositions, and is wholly independent of what proportions water and phosphatides constitute with respect to the formulation as a whole.

Typically, the phosphatide content of the composition will be calculated from the measured lecithin content, phosphatides being taken as a fraction of the lecithin content (typically, phosphatides comprise about 63 percent of standard lecithin; other modified lecithins vary in phosphatide content as disclosed elsewhere herein). According to formula (I), 9 molecules of water per molecule of phosphatidylcholine is equivalent to 174 percent RWC. As stated above, the hydrophilic zwitterionic head portion of the phosphatidylcholine molecule swells with increasing hydration until a maximum hydration is reached somewhere between about 33.9 to 40.3 percent RWC.

By way of illustration, in a cooking spray formulated with 6 percent lecithin having 63 percent phosphatides, the minimum effective amount of added water needed to achieve a transparent, smooth, foamless spray coating would be about 1.5 percent, i.e., 28.4 percent RWC where the propellant level is about 25 percent by weight. For the same cooking spray formulation having 6 percent lecithin, the maximum water content to produce a transparent spray coating would be about 5 to 6 percent, i.e., about 57 to 61 percent RWC. Above the range of 5 to 6 percent water in the formulation, which corresponds to 57 to 61 percent RWC in this example, an undesirable milkiness appears in the non-foaming spray coating as a consequence of hydration of lecithin.

Commercial lecithins normally contain less than 0.1 percent by weight water. This amount is insufficient for the degree of lecithin hydration required to obtain the non-foaming characteristic of spray coatings. Such commercial lecithins are clear and flowable and have an amber color and may be dispersed in oil, without settling, in the absence of added water.

A series of formulations was prepared containing lecithin and water in the amounts indicated in TABLE IV below, 25 percent propellant and the balance comprising winterized canola oil.

TABLE IV

This TABLE IV shows the influence on spray coating characteristics of the water-phosphatide relationship expressed as percent RWC in formulations containing various amounts of water and standard lecithin and propellant in the amount of 25 percent. It should be noted that at increased amounts of propellant (not represented in the data of TABLE IV) smooth and clear coatings were produced at % RWC values as low as 21 percent. Percentages by weight are shown in TABLE IV as "%".

TABLE IV

| % Lecithin | % Water | % RWC | Coating Characteristics[(1)] |
|---|---|---|---|
| 2 | 0.5 | 28.4 | Smooth, clear |
| 4 | 0.5 | 16.6 | Foam |
| 4 | 1.0 | 24.4 | Smooth, clea`r |
| 6 | 0.5 | 11.7 | Foam |
| 6 | 1.0 | 20.9 | Foam |
| 8 | 1.0 | 16.6 | Foam |
| 8 | 2.0 | 28.4 | Smooth, clear |
| 10 | 1.0 | 13.7 | Foam |
| 12 | 1.0 | 11.7 | Foam |
| 12 | 2.0 | 20.9 | Bubbles |
| 12 | 3.0 | 28.4 | Clear |
| 14 | 3.0 | 25.4 | Slight Foam |
| 18 | 3.0 | 20.9 | Foam |

[(1)]Spray coatings identified as smooth in this TABLE were also transparent; spray coatings that foamed were not evaluated for transparency.

TABLE IV correlates observations of spray coatings from formulations having various percentages of lecithin and water, and presents with each observation the amount of water stated as percent RWC. TABLE IV thus provides a means for relating the spray coating observations to the relative proportions of water to phosphatides, irrespective of their quantities as perecentages of the respective formulations as a whole. Water and lecithin contents presented in TABLE IV range from 0.5 to 3.0 and from 2 to 18 percent by weight, of the various formulations, respectively. The data and descriptions of TABLE IV show that clear, non-foaming parting composition sprays containing standard lecithin were produced when the percent RWC is at least about 21, preferably, at least about 21 to 25, which corresponds to a weight ratio of lecithin to water of 2.9:1 to 2.5:1. These values are slightly smaller than the concentration of water at which phosphatidylcholine hydration reaches the final stage of molecular swelling described above. The smooth, clear character continues until the relative water and phosphatides content reaches about 61 percent RWC, preferably, about 57 to 61 percent RWC.

For purposes of illustration, if a food release spray formulation contains 6 percent by weight of lecithins which comprise 63 percent by weight phosphatides (6%×63%= about 3.8 percent phosphatides in the composition), the minimum effective range for added water to achieve a transparent, smooth and foamless aerosol spray coating would be about 1.0 to 1.3 percent by weight water, equivalent to about 21 to 25 percent RWC. The maximum water content for such formulation to produce a transparent aerosol spray coating would be about 5 to 6 percent by weight water, equivalent to about 57 to 61 percent RWC. In this regard, see the data of TABLE I above. Above about 61 percent RWC, an undesirable haze or opaqueness begins to appear in the non-foaming spray coating which haze is, as described above, believed to be a consequence of excessive hydration of the lecithin. To summarize, a percent RWC of at least about 21 providesia spray coating which is acceptably free of foam and a percent RWC of not more than about 61 provides a spray-coating which is acceptably clear. If the absolute amount of phosphatides increases, the absolute amount of water may be increased, in order to keep within the range of from about 21 to 61 percent RWC, preferably from about 25 to 57 percent RWC. However, it must be recognized that many other factors affect the foaming or non-foaming characteristics of a particular composition. These include the droplet size of the spray, larger droplets favoring formation of foam because the greater volume-to-surface area ratio of larger droplets requires more solublized propellant breakthrough the surface of the spray-coating, thereby increasing the tendency to foaming. Droplet size is affected by the valve design, especially the orifice configuration, and the mechanical break-up efficiency of the valve. Other factors include the propellant content, the propellant composition (because different vapor pressures and propellant densities affect foaming characteristics), the temperature, viscosity and the composition of the formulation being sprayed, (type of oil, quantity of lecithin, quantity of suspending agent, etc.). Further, the thickness of the sprayed-on coating applied to the surface being sprayed plays a role in the degree of foaming or whether or not foaming occurs. Thus, the spray rate, the distance between the nozzle and the surface on which spraying takes place, the temperature and type of surface being sprayed upon, the distance of the spray can from the surface and other such factors. Generally, thinner sprayed-on coatings suffer less from foaming than do thicker coatings. Nonetheless, given that the degree of foaming is affected by such factors, the present invention provides guidance to the skilled practitioner in the provision of a food release composition, i.e., a parting composition for cooked foods, wherein foaming may be significantly reduced or eliminated in compositions which are substantially free of foam-suppressing amounts of monohydric aliphatic alcohols.

While the invention has been described in detail with respect to specific preferred embodiments thereof, it is to be understood that upon a reading of the foregoing description, variations to the specific embodiments dislcosed may occur to those skilled in the art and it is intended to include such variations within the scope of the apended claims.

What is claimed is:

1. An aerosol-dispensable foodstuffs parting composition for coating cooking surfaces is combined with a pressurized, normally gaseous propellant suitable for discharging the composition as an aerosol spray, and consists essentially of lecithin, water and an organic, non-soap fluidizing agent all dispersed in an edible oil vehicle, the weight of the edible oil vehicle present in the composition exceeding the combined weight of the lecithin and the water present, the water being present in an amount which is sufficient to partially, but not fully, hydrate the lecithiin to an extent that solubility of the lecithin in the edible oil is sufficiently reduced so that aerosol-dispensed coatings of the composition are rendered non-foaming and clear at ambien temperatures, and the fluidizing agent being present in an amount sufficient to inhibit the lecithin from congealing in the edible oil vehicle.

2. The parting composition of claim 1 wherein the fluidizing agent comprises a free fatty acid material.

3. The parting composition of claim 2 wherein the free fatty acid material comprises one or more $C_{12}$ or higher fatty acids.

4. The parting composition of claim 3 wherein the free fatty acid material comprises one or more $C_{12}$ to $C_{20}$ fatty acids.

5. The parting composition of claim 2 comprising a free fatty acid material selected from the group consisting of lauric acid, inoleic acid, oleic acid, stearic acid, palmitic acid, myristic acid, free fatty acid materials derived from edible plant and animal fats and oils, and combinations thereof.

6. The parting composition of claim 2 wherein lecithin comprises from about 1 to 25 percent by weight of the composition and the free fatty acid material comprises from about 0.05 to about 8.0 percent by weight of the composition.

7. The parting composition of claim 6 wherein the free fatty acid material comprises from about 0.4 to about 5.0 percent by weight of the composition.

8. The parting composition of claim 7 wherein the fluidizing agent comprises a glyceride from the group consisting of polyglycerol oleate, acetylated monoglycerides and combinations thereof.

9. The parting composition of claim 8 wherein the lecithin comprises from about 1.0 to about 25 percent by weight and the glyceride comprises from about 0.4 to about 5.0 percent by weight of the composition.

10. The parting composition of claim 6 wherein the free fatty acid material comprises from about 0.1 to about 2.0 percent by weight of the composition.

11. The parting composition of claim 1 wherein the fluidizing agent comprises a glyceride.

12. The parting composition of claim 1, claim 2 or claim 9 wherein the composition is substantially free of monohydric aliphatic alcohols.

13. The parting composition of claim 1, claim 2 or claim 9 wherein the lecithin has a known phosphatide content and the lecithin and water are present in amounts to provide a percent relative water content ("percent RWC"), which is calculated by dividing the weight of water in the composition by the sum of the weight of water plus phosphatides in the composition, and multiplying the result by 100, of from about 21 to 61 percent RWC.

14. The parting composition of claim 13 wherein the percent relative water content is from about 25 to 57 percent RWC.

* * * * *